(12) United States Patent
Magumbe et al.

(10) Patent No.: US 7,371,357 B2
(45) Date of Patent: May 13, 2008

(54) PROCESS FOR REMOVAL OF POLLUTANTS

(75) Inventors: Lionel Magumbe, Ontario (CA);
Douglas S. Scott, Ontario (CA)

(73) Assignee: Clean World Strategies Corp., Toronto, Ontario (CA)

( * ) Notice: Subject to any disclaimer, the term of this patent is extended or adjusted under 35 U.S.C. 154(b) by 378 days.

(21) Appl. No.: 11/260,495

(22) Filed: Oct. 28, 2005

(65) Prior Publication Data

US 2006/0245993 A1 Nov. 2, 2006

Related U.S. Application Data

(60) Provisional application No. 60/675,092, filed on Apr. 27, 2005.

(51) Int. Cl.
*B01D 53/22* (2006.01)
*B01D 53/34* (2006.01)
*C01B 7/01* (2006.01)

(52) U.S. Cl. .......... 423/210; 423/219; 423/220; 423/239.1; 423/240 R; 423/242.1; 423/243.08; 423/395; 423/430; 423/481; 423/497; 423/498; 423/554; 423/566.1; 95/45; 95/47; 95/52; 95/54

(58) Field of Classification Search ........... 423/481, 423/497, 498, 566.1, 554, 395, 430, 210, 423/240 R, 242.1, 243.08, 239.1, 219, 220; 95/45, 47, 52, 54
See application file for complete search history.

(56) References Cited

U.S. PATENT DOCUMENTS

| | | | | | |
|---|---|---|---|---|---|
| 4,362,709 | A | * | 12/1982 | Grohmann et al. | 423/636 |
| 4,874,591 | A | * | 10/1989 | Jeney | 423/240 R |
| 5,439,658 | A | * | 8/1995 | Johnson et al. | 423/243.07 |
| 5,560,894 | A | * | 10/1996 | Ueno et al. | 423/239.1 |
| 5,888,465 | A | * | 3/1999 | Rappold et al. | 423/240 S |
| 6,281,164 | B1 | * | 8/2001 | Demmel et al. | 502/439 |
| 6,379,638 | B1 | * | 4/2002 | Matacotta et al. | 423/210 |

* cited by examiner

*Primary Examiner*—Timothy C. Vanoy
(74) *Attorney, Agent, or Firm*—Arent Fox LLP

(57) ABSTRACT

A process for the removal of pollutants from a combustion process and, more particularly, a process for removing pollutants such as carbon dioxide, mercury, sulphur dioxide, nitrogen compounds and oxygen compounds from a combustion process. The process includes the removal of pollutants from a combustion process that produces an emission comprising: cooling the emission to a temperature of about 200° C.; removing nitrogen, water and oxygen from the emission to produce a gas containing a concentration of pollutants; contacting the gas with an aqueous magnesium chloride solution, wherein a slurry mixture is formed; and cooling the gas and the slurry mixture, wherein hydrochloric acid vapour and a sludge are formed.

16 Claims, 3 Drawing Sheets

PROCESS FOR REMOVAL OF POLLUTANTS

CROSS REFERENCE TO RELATED APPLICATION

The present application claims benefit under 35 U.S.C. § 119 to U.S. Provisional Patent Application No. 60/675,092 filed Apr. 27, 2005 entitled "Carbon Dioxide Sequestration" filed on Apr. 27, 2005, the disclosure of which is hereby incorporated by reference in its entity.

FIELD OF THE INVENTION

The present invention relates to a process for the removal of pollutants from an emission from a combustion process and, more particularly, to a process for removing pollutants such as carbon dioxide, mercury, sulphur dioxide, nitrogen compounds and oxygen compounds from an emission from a combustion process.

BACKGROUND OF THE INVENTION

The reliance on fossil fuels by power utilities and industrial applications (e.g., iron, steel and cement manufacturers) results in the unwanted production of many pollutants. For example, the emitted exhaust gas generated from thermal power plants using coal, LNG and petroleum or exhaust gas from gas turbine generators, incinerators, etc. are enormous. The exhaust gas may contain many pollutants including, for example, carbon dioxide, mercury, sulphur compounds, nitrogen compounds and carbon compounds. These pollutants are known to contribute significantly to atmospheric pollution. For example, carbon dioxide emissions are harmful for several reasons including their contribution to global warming, a trend that may lead to rising sea waters, droughts and agriculture disasters. Nature, Geological Society of London, Mar. 15, 2001.

The rise in greenhouse gas emissions, particularly carbon dioxide, has been attributed to the increased use of fossil fuels. It has been estimated that 22 gigatons (Gt) of carbon dioxide are emitted per year as a result of the use of fossil fuels. Worldwide, carbon dioxide emissions from coal-fired power plants account for about 1.8 Gt C/yr, of the total 6 Gt C/yr. Coal is the fuel most widely used for the generation of electricity worldwide because it is readily available, easily transportable, and relatively inexpensive. Indeed, approximately 70% of all the electricity used in the United States is generated from coal and natural gas. The increasing effects of greenhouse gases, such as carbon dioxide, have challenged the industrialized world to find new and better ways to meet the increasing need for energy while reducing the emission of pollutants.

Mercury is another pollutant that is particularly harmful to human health. In fact, ingestion of large amounts of mercury results in almost immediate death due to heart attack. Each year approximately seventy-five tons of mercury embedded in coal are delivered to fossil fuel burning power plants in the Province of Ontario. The combustion of the coal results in approximately two thirds of the mercury (i.e., 50 tons) emitted into the air over the Province of Ontario each year. A typical dispersion pattern of mercury over the Province of Ontario is illustrated in FIG. 1. As a result of the prevailing westerly winds, flue gases containing mercury may be disbursed from Ontario over great distances including much of New York State and New England.

An area that has been of particular concern is the release of sulphur compounds into the atmosphere during the refining of petroleum, the sweetening of natural gas, the processing of ore and the destructive distillation of coal. In particular, sulphur dioxide discharge occurs primarily due to the combustion of sulphur-containing fossil fuels, petroleum refining, manufacturing of sulphuric acid and smelting of sulphur containing ores. The major origin of sulphur dioxide is from sulphur bearing coals burned in the process of producing electrical energy. Sulphur dioxide has been reported to be responsible for damage to agricultural crops and the natural lakes throughout the world, notably in the U.S. and Canada.

In addition, the burning of fossil fuels also creates emissions of nitrogen and oxygen compounds that may be harmful. When these by-products enter the atmosphere, they may be transformed into acid and returned to earth as acid rain precipitation. Nitrogen emissions are particularly problematic because they form particulate matter in the atmosphere such as combinations of dust, soot and other solid-liquid compounds that restrict visibility and contribute to haze.

Another natural result from burning fossil fuels, particularly coal, is the emission of fly ash. Fly ash is generally considered to be mineral matter suspended in combustion gases. For each unit of pulverized coal burned, 60 to 80% of the particulate mineral matter is discharged in the flue gas as fly ash. Although fly ash may be relatively harmless, fly ash emissions have received particular attention because they can be observed leaving smokestacks and are generally considered to be unsightly.

Typically gas purification systems combine several basic processes into one overall system to remove pollutants. For example, refuse burning processes for treating, e.g., municipal waste, provides for the removal of particulates from flue gas by means of electrostatic filters or fabric filters and the partial removal of gaseous pollutants from the gas by acid or alkali treatment. Traditional fossil fuel burning systems also consist of relatively simple air pollution control equipment. Typically the system directs the hot combustion flue gases sequentially through a selective catalytic reducer, an electrostatic precipitator, a wet scrubber and, finally, into a smokestack for distribution into the atmosphere.

The selective catalytic reducer is used primarily to reduce concentrations of nitrogen compounds (e.g., $NO_x$) and oxygen compounds by passing flue gases through a catalytic converter. The gas reacts with the ammonia of the catalyst to convert the nitrogen compounds and oxygen compounds into nitrogen gas and water. Selective catalytic reactors are practical for the removal of nitrogen compounds and oxygen compounds, but not for the removal of carbon dioxide, sulphur dioxide, mercury or fly ash.

The electrostatic precipitator is used primarily to reduce fly ash in the flue gas. The flue gas is passed through pipes containing negatively charged plates that impart a negative charge on the fly ash particles. The particles are then routed past positively charged plates, or grounded plates, which attract the now negatively charged fly ash particles. The particles adhere to the positive plates and can be collected for disposal. A typical electrostatic precipitator is illustrated in FIG. 2. Electrostatic precipitators are large and expensive to maintain, and are only effective for the removal of the particulate matter that comprises fly ash and not for the removal of gaseous pollutants, such carbon dioxide, sulphur dioxide or mercury.

Wet scrubbers are used to control sulphur dioxide omissions through a process known as wet flue gas desulphurization (FGD). Wet FDG systems remove gaseous sulphur dioxide from flue gas by absorption. The sulphur dioxide is contacted with caustic slurry consisting typically of water and lime. The lime reacts with the sulphur dioxide to form gypsum ($CaO+SO_2 \rightarrow CaSO_4$). Some gaseous compounds of mercury may also be absorbed in the liquid slurry; however, the absorption efficiency of mercury will depend on the speciation of the mercury. Thus, wet scrubbers are useful primarily for the removal of sulphur dioxide and not for the removal of other gaseous pollutants, such carbon dioxide, or mercury.

Sequestration has been proposed as one possible method for the removal of pollutants. For example, carbon dioxide sequestering comprises forming carbonates from readily available minerals. The concept of mineral carbonation is based on the idea that forming magnesium or calcium carbonates from most minerals is exothermic and thermodynamically favored. The resulting carbonates are stable solids that are known to be environmentally benign.

Lackner et al. have reported the sequestering of carbon dioxide through the formation of carbonates using magnesium or calcium bearing silicate minerals, e.g., serpentine. One implementation is based on an HCl extraction in which magnesium is obtained as $MgCl_2$. The HCl is quantitatively recovered and the $MgCl_2$ is transformed into $Mg(OH)_2$. The hydroxide is carbonated in a gas-solid reaction that provides the energy consumed in recovering the HCl, resulting in an overall exothermic process. Lackner et al. also reported the possibility of direct carbonation of serpentine and provides an analysis of the thermodynamics of the process. See Lackner et al., *Mineral Carbonates as Carbon Dioxide Sinks*, which can be found as http://www.netldoe.gov/publications/proceedings/98/98ps/pspa-8.pdf.

However, there is a need in the art to provide a cost effective process to reduce pollutants, such as, carbon dioxide, mercury, sulphur compounds, nitrogen compounds and carbon compounds, which are produced during the combustion of fossil fuels and during other industrial applications. Moreover, there is a need in the art to provide a process that will allow the use of coal as a fuel source since it is readily available and relatively inexpensive in comparison to alternative energy sources.

SUMMARY OF THE INVENTION

The present invention relates to a process for the removal of pollutants from an emission from a combustion process and, more particularly, to a process for removing pollutants such as carbon dioxide, mercury, sulphur dioxide, nitrogen compounds and oxygen compounds from an emission from a combustion process.

In an exemplary embodiment, the process of the present invention may be used to remove pollutants from an emission of a combustion process by: (a) cooling the emission to a temperature of about 200° C.; (b) removing nitrogen, water and oxygen from the emission to produce a gas containing a concentration of pollutants; (c) contacting the gas with an aqueous magnesium chloride solution, wherein a slurry mixture is formed; and (d) cooling the gas and the slurry mixture, wherein hydrochloric acid vapour and a sludge are formed.

In a preferred embodiment, in step (a) the emission gas is cooled to a temperature below about 200° C. In another preferred embodiment, in step (a) the emission gas is cooled to a temperature between about 150° C. to about 200° C.

In another preferred embodiment, in step (c) the aqueous magnesium chloride solution is in the form of a mist of droplets. In a further preferred embodiment, the size of the droplets is between about 20 to about 30 microns.

In yet another preferred embodiment, in step (d) the gas and slurry mixture is cooled to a temperature of less than about 10° C.

DETAILED DESCRIPTION

Figure 1:
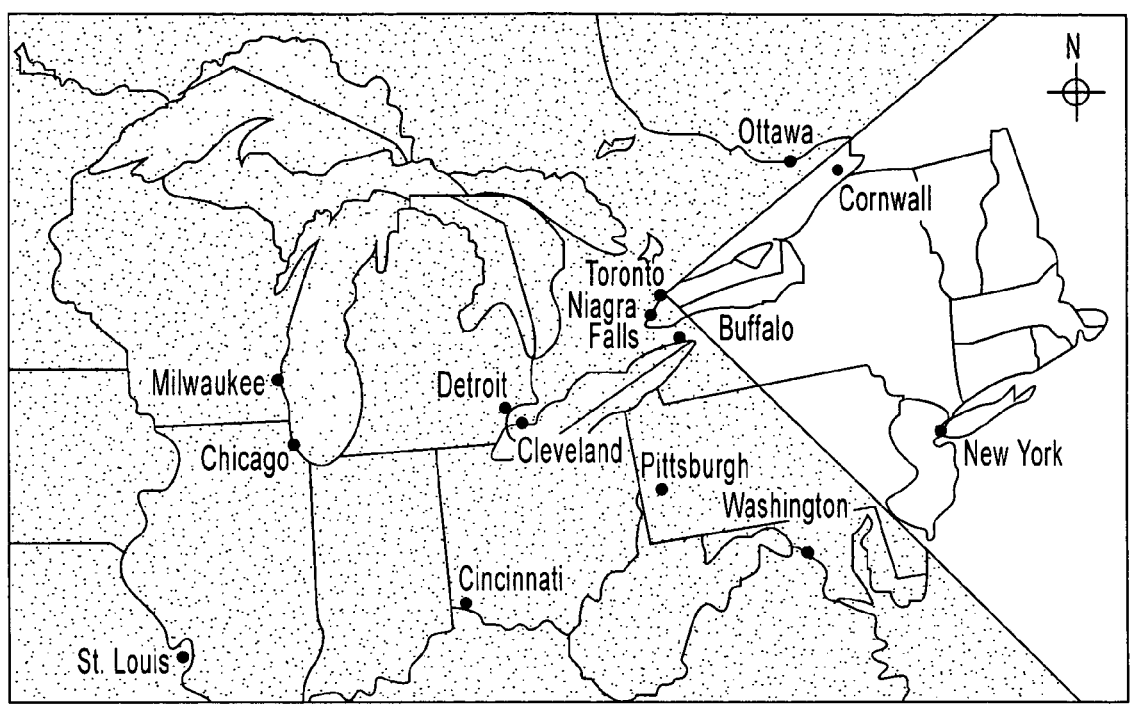
FIG. 1 shows a typical dispersion pattern of mercury over the Province of Ontario.
Figure 2:
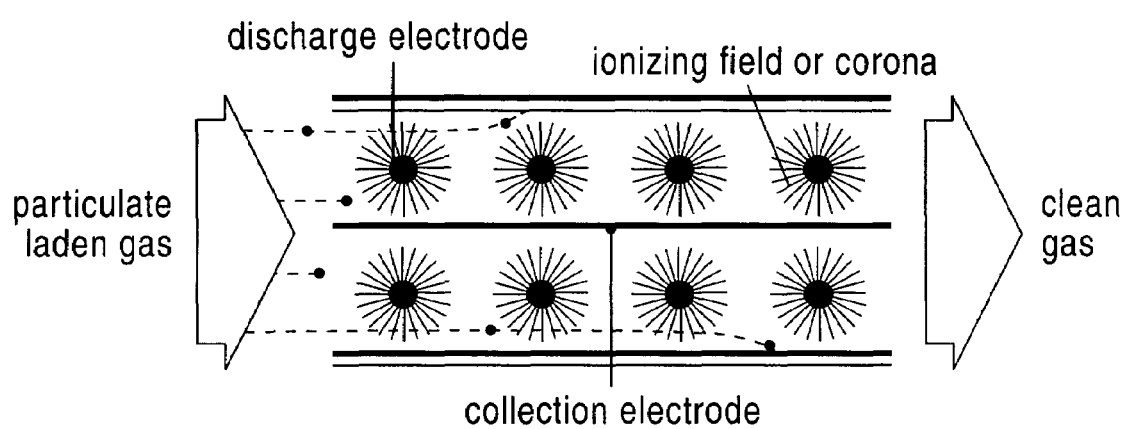
FIG. 2 shows a top view of a typical electrostatic precipitator.

The present invention relates to a process for the removal of pollutants from an emission from a combustion process and, more particularly, to a process for removing pollutants such as carbon dioxide, mercury, sulphur dioxide, nitrogen compounds and oxygen compounds from an emission from a combustion process.

The process of the present invention may be used in any industrial application to remove pollutants from gas, including, e.g., power utilities, refining plants and incineration plants. The process of the invention is particularly suited for adoption by advanced power plants such as zero-emissions Vision 21 system configurations developed by the United States Department of Energy's fossil energy program.

The objects of the present invention are achieved through a process of sequestering pollutants to form a stable, benign solid material that is readily disposable without harmful effects to the environment. For example, the present invention provides a process for the removal of pollutants generated by the combustion of fossil fuel in power generation plants by using magnesium chloride. The use of magnesium chloride enables the removal of not only carbon dioxide but also other pollutants including, but not limited to, mercury, nickel, copper, iron, chlorine, sulphur, nitrogen compounds, oxygen compounds, or mixtures thereof.

The process of the present invention eliminates the need for traditional reduction technologies including electrostatic precipitators, selective catalytic reduction equipment for the removal of nitrogen compounds and oxygen compounds, and wet scrubbers thereby reducing the operating costs of older facilities and the capital costs associated with the construction of new facilities. The process of the present invention also eliminates the need to use lime in wet flue gas desulphurization systems, typical in fossil fuel burning facilities, such as coal-fired power plants.

In an exemplary embodiment, the process of the present invention comprises the removal of pollutants from a combustion process that produces an emission comprising: (a) cooling the emission to a temperature of about 200° C.; (b) removing nitrogen, water and oxygen from the emission to produce a gas containing a concentration of pollutants; (c) contacting the gas with an aqueous magnesium chloride solution, wherein a slurry mixture is formed; and (d) cooling the gas and the slurry mixture, wherein hydrochloric acid vapour and a sludge are formed.

The aqueous magnesium chloride solution used according to the present invention may be produced by combining a magnesite-based mineral such as Serpentine, Antigorite, Lizardite, Olivine or Dunite with hydrochloric acid. Magnesium based materials should be selected which do not contain asbestos. The resulting reaction produces magnesium chloride with silica and water as by-products. For example, magnesium chloride may be produced from the reaction of Serpentine and hydrochloric acid:

$$Mg_3(Si_2O_5)(OH)_4 + 6HCl \rightarrow 3MgCl_2 + 2SiO_2 + 5H_2O$$

It is preferable to produce the magnesium chloride at a location close to the source of the magnesium-based minerals, as the cost of shipping the minerals to a distant location may be prohibitive. The magnesium chloride may then be transported to a facility for the production of the aqueous magnesium chloride solution.

In a preferred embodiment of the present invention, after the gas and the slurry mixture are cooled to form hydrochloric acid vapour and a sludge, the hydrochloric acid vapour is collected. For example, as described above, the hydrochloric acid may be collected while the hydrochloric acid vapour is cooled using, e.g., a heat exchanger. In a further preferred embodiment, the collected hydrochloric acid is recycled and reacted with a magnesium-based mineral selected from the group consisting of Serpentine, Antigorite, Lizardite, Olivine or Dunite, wherein the magnesium chloride solution is produced.

Figure 3:
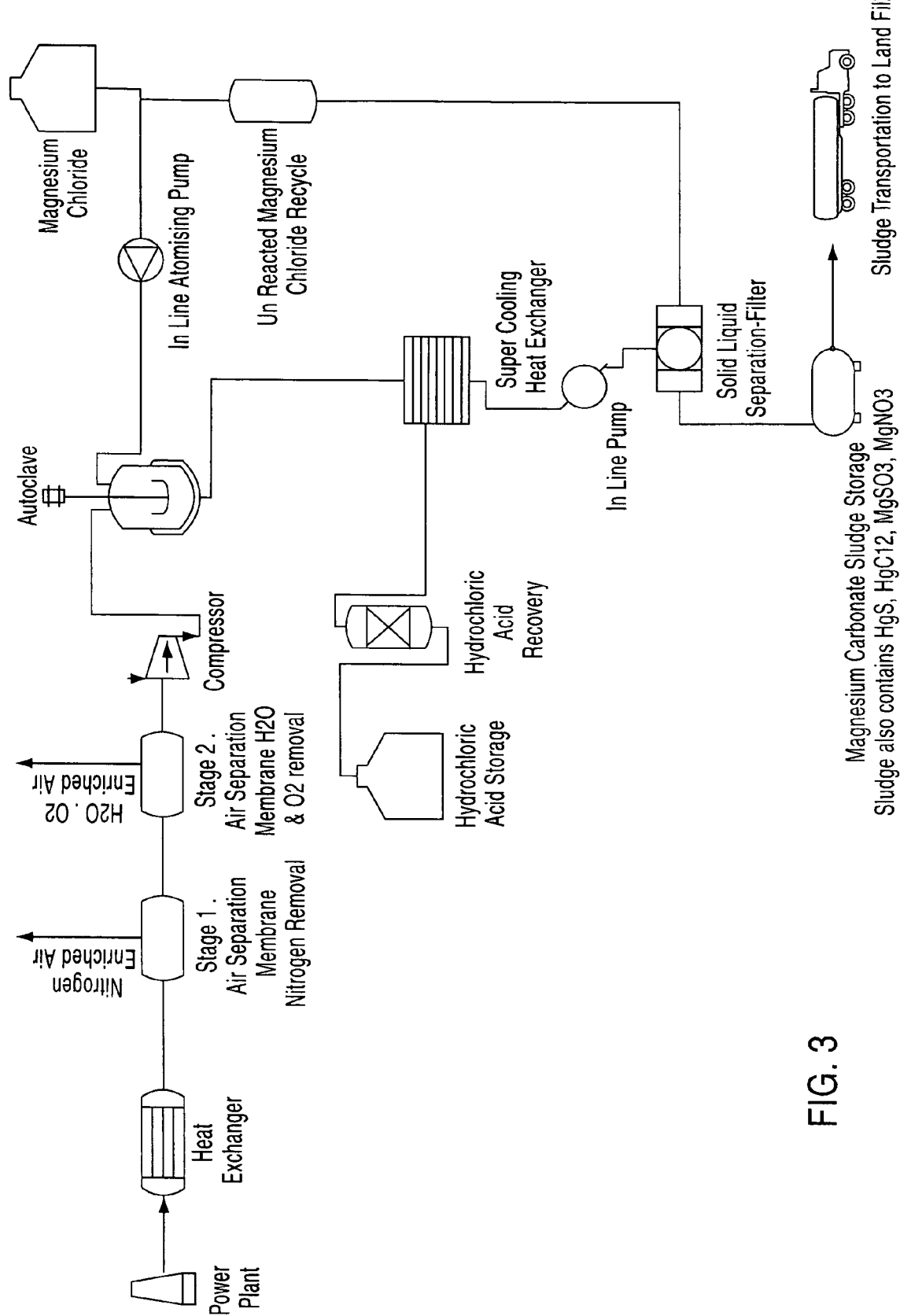
FIG. 3 shows a schematic diagram of an apparatus that may be used according to the process of the present invention.

A schematic diagram of an exemplary apparatus that may be used to perform the process of the present invention is shown in FIG. 3.

In some embodiments, the process according to the present invention may used to remove pollutants from the combustion of coal. Engine emissions may be measured using a Horiba or Beckman gas analyser. Table 1 shows an exemplary composition of gas that may be emitted from the combustion of coal. In addition, trace amounts of mercury may also be present in the gas composition.

TABLE 1

Pre Membrane Gas Composition

|  | Vol % |
|---|---|
| Nitrogen (N2) | 67.79 |
| Carbon Dioxide (CO2) | 8.08 |
| Oxygen (O2) | 0.85 |
| Argon (Ar) | 1 |
| Water (H2O) | 22.28 |
| SOX | 2.44 ppm |
| NOX | 200 ppm |
| Total | 100 |

In other embodiments, the process according to the present invention may be used to remove pollutants from the exhaust of a natural gas engine. Table 2 shows an exemplary composition of gas that may be emitted from the exhaust of a natural gas engine. The exhaust gas may contain small amounts of oxides of nitrogen (NOx), carbon monoxide and unburned, or partially burned, hydrocarbons and may be very similar in composition to that produced by a typical coal plant, as shown in Table 3.

TABLE 2

| Constituent | % Volume |
|---|---|
| Nitrogen | 70.7 |
| Water | 19.4 |
| Carbon dioxide | 8.6 |
| Oxygen | 0.4 |
| Nox | 0.21 |
| Carbon Monoxide | 0.44 |
| Unburned Hydrocarbon | 0.17 |

TABLE 3

| | % Volume | |
|---|---|---|
| Constituent | NG | Coal |
| Nitrogen | 70.7 | 67.79 |
| Water | 19.4 | 22.28 |
| Carbon dioxide | 8.6 | 8.08 |
| Oxygen | 0.4 | 0.85 |
| Nox | 0.21 | 0.02 |
| Carbon Monoxide | 0.44 | |
| Unburned Hydrocarbon | 0.17 | |

In other embodiments, the process according to the present invention may used to remove pollutants from the exhaust of a diesel engine. For example, using the process according to the present invention, pollutants, such as carbon compounds, e.g., carbon dioxide and carbon monoxide, may be removed from the exhaust of a diesel engine. In addition, the process according to the present invention may be used to remove nitrogen and oxygen compounds. Table 4 shows an exemplary composition of gas emitted from a typical diesel Caterpillar engine.

TABLE 4

| Gen Set Packaged Diesel | |
|---|---|
| Power KW | 2000 |
| Exhaust Temp | 504 C. |

| | g/bhp-h |
|---|---|
| Nox | 12 |
| CO | 3.5 |
| HC | 0.4 |

According to one embodiment, the emission from a combustion process is first cooled to a temperature of about 200° C. In a preferred embodiment, the emission gas is cooled to a temperature below about 200° C. In another preferred embodiment, the emission gas is cooled to a temperature between about 150° C. to about 200° C. Any method known by one skilled in the art may be employed to cool the emitted combustion gas. For instance, the gas can be cooled using a heat exchanger, as shown in FIG. 3.

As a consequence of cooling the emitted gas, the gas pressure will decrease within a particular pressure range. The ideal gas law (PV=nRT, where n=0.082) may be used to illustrate how the gas pressure in the heat exchanger will decrease as the gas is cooled. Assuming the gas enters the heat exchanger at 600° C. (873 degrees Kelvin) the pressure of the gas can be approximated to be about 296 kPa. According to one embodiment of the present invention the gas may exit the heat exchanger at 200° C. (473 degrees Kelvin) corresponding to an approximate pressure of the gas of about 161 kPa. Thus, according to some embodiments of the present invention, after the gas is cooled the pressure may significantly drop compared to the pressure of the emitted gas.

In another step according to the present invention, nitrogen, water and oxygen are removed from the emission to provide a gas containing a concentration of pollutants. In some embodiments, the concentrated pollutants in the gas are selected from the group consisting of mercury, nickel, copper, iron, chlorine, sulphur, a nitrogen compound, an oxygen compound, a carbon compound or combinations thereof.

In a preferred embodiment, the removal of nitrogen, water and oxygen from the emission comprises using two air separation membranes, wherein the first air separation membrane removes nitrogen and the second air separation membrane removes water and oxygen. For example, in the first stage membrane, the nitrogen is removed from the gas leaving a carbon dioxide/oxygen rich product stream. The product stream is then passed through a second air separation membrane to remove the water and oxygen. The by-products of the air separation membranes namely nitrogen, water and hydrogen are not harmful and may, therefore, be vented to the atmosphere.

Fractional separation of the gas may be conducted by any method known to one skilled in the art or through the use of air separation membranes that are readily available on the open market. For example, a particularly suitable air separation membrane is made by Generon IGS, Inc. and marketed under the trademark GENERON®.

Table 5 shows the exemplary composition of the gas emitted from the combustion of coal after removal of nitrogen, water and oxygen. In addition, trace amounts of mercury may also be present in the gas. As shown in Table 5, the gas exiting the air separation membranes may contain in excess of 80% carbon dioxide.

TABLE 5

Post-Membrane Gas Composition

| | Vol % |
|---|---|
| Nitrogen (N2) | 0 |
| Carbon Dioxide (CO2) | 81.21 |
| Oxygen (O2) | 8.54 |
| Argon (Ar) | 10.05 |
| Water (H2O) | 0 |
| SOX | 0.0025 |
| NOX | 0.20 |
| Total | 100.00 |

In still another step according to the present invention, the gas is contacted with an aqueous magnesium chloride solution, wherein a slurry mixture is formed. In preferred embodiments, the magnesium chloride solution will contain 15 to 30% $MgCl_2$. In other preferred embodiments, the magnesium chloride solution will contain 20 to 25% $MgCl_2$. In a preferred embodiment, the aqueous magnesium chloride solution is in the form of a mist of droplets. In a further preferred embodiment, the size of the droplets is between about 20 to about 30 microns. In some embodiments, the mist is formed by forcing the solution through an orifice under pressure.

In some examples, the gas may exit the air separation membrane and be pumped into an autoclave where it is contacted with the aqueous magnesium chloride solution. The temperature and pressure in the autoclave may be maintained during this process using, e.g., pressure release valves on the autoclave. The atomised magnesium chloride may be injected in the one or more compartments of the autoclave either continually or intermittently during the process. In preferred embodiments, the autoclave will have an agitator to enhance gas/liquid reaction. Any autoclave known in the art may be used according to the process of the present invention. For example, an autoclave may be chosen using an approach by O'Kane (1963 October—presented at the 13$^{th}$ Annual Canadian Chemical Engineering Conference, Montreal, Quebec, "Pressure Leach Autoclave Design"). The sizing methodology will involve taking a magnesium chloride conversion curve time to determine each continuous autoclave compartment residence time. This approach assumes that the reaction is rapid and that the heterogeneous conversion approaches a homogenous one.

In still another step according to the present invention, the gas and the slurry mixture are cooled, wherein hydrochloric acid vapour and a sludge are formed. In a preferred embodiment, the gas and slurry mixture are cooled to a temperature of less than about 10° C. As stated above, any method known by one skilled in the art may be employed to cool the emitted combustion gas. For instance, the gas can be cooled using a heat exchanger, as shown in FIG. 3.

In some embodiments, the gas and slurry mixture will be cooled in a heat exchanger. In further embodiments, the gas, which comprises a vapour of hydrochloric acid and trace amounts of oxygen and nitrogen, may be drawn from the heat exchanger and contacted with water in a hydrochloric acid recovery unit. The resulting hydrochloric acid may then be used directly or stored for subsequent use or sale. The trace amounts of nitrogen and oxygen gas by-products taken from the hydrochloric acid recovery unit may then be vented to the atmosphere.

In some embodiments of the present invention, the emission from the combustion process comprises sulphur and after the gas and the slurry mixture are cooled the sludge comprises magnesium sulphate.

For example, during the process of the invention, gaseous compounds of sulphur, such as sulphur dioxide, found in the emissions may be converted into magnesium sulphate. The sulphur dioxide may react in the slurry mixture to form magnesium sulphate and hydrochloric acid. For example:

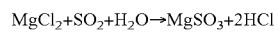
$MgCl_2+SO_2+H_2O \rightarrow MgSO_3+2HCl$

In other embodiments of the present invention, the emission from the combustion process comprises mercury and sulphur and after the gas and the slurry mixture are cooled the sludge comprises mercuric sulphide (HgS).

During combustion, the mercury in a fossil fuel, such as coal, is volatilized and converted in the high temperature regions of coal-fired boilers to elemental mercury (Hg). During the process of the invention, as the gas emissions are cooled, Hg may be converted to gaseous mercury compounds and/or solid phase or particulate bound mercury. The gaseous compounds may react with sulphides, such as hydrogen sulphide, to form mercury sulphide, mercuric chloride and/or magnesium sulphite. For example:

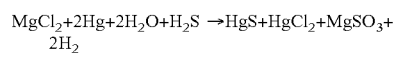
$MgCl_2+2Hg+2H_2O+H_2S \rightarrow HgS+HgCl_2+MgSO_3+2H_2$

In other embodiments of the present invention, the emission from the combustion process comprises nitrogen and oxygen and after the gas and the slurry mixture are cooled the sludge comprises magnesium nitrate.

For example, during the process of the invention gaseous compounds of nitrogen and oxygen, may be converted into magnesium nitrate. For example:

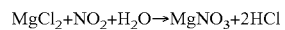
$MgCl_2+NO_2+H_2O \rightarrow MgNO_3+2HCl$

In still other embodiments of the present invention, the emission from the combustion process comprises carbon and after the gas and the slurry mixture are cooled the sludge comprises magnesium carbonate.

Thus, the process of the invention may be used to remove carbon dioxide from the emission of a combustion process. In particular, carbon dioxide, water and magnesium chloride may react to form magnesium carbonate and hydrochloric acid. For example:

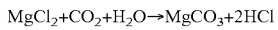

Thus, using the process of the present invention, a sludge will be formed that may comprise unreacted aqueous magnesium chloride ($MgCl_2$), mercury sulphide (HgS), mercury chloride ($HgCl_2$), magnesium sulphite ($MgSO_3$), magnesium nitrite ($MgNO_3$), magnesium carbonate ($MgCO_3$) or combinations thereof.

The sludge may be pumped to a solid/liquid separation filter to separate the un-reacted magnesium chloride, which can be extracted and stored for further use according to the present invention. The remainder of the sludge will contain mercury sulphide (HgS), mercury chloride ($HgCl_2$), magnesium sulphite ($MgSO_3$), magnesium nitrite ($MgNO_3$) and magnesium carbonate ($MgCO_3$) or combinations thereof, which can then be safely disposed. The remainder of the slurry may also contain certain base metals such as nickel, iron and copper that can also be extracted and sold.

Thus, the present invention provides a novel process for the removal of pollutants from emission gases. Accordingly, the process of the invention enables a fossil fuel burning facility such as a coal burning power plant to use less expensive coal having a higher sulphur content thereby further reducing operating costs. Moreover, since the direct carbonation of magnesium chloride is an exothermic process the present invention avoids energy intensive intermediate processes.

In addition, the process of the present invention results in the production of value added by-products including hydrochloric acid, nickel, copper, iron and magnesium chloride. Furthermore, the magnesium chloride produced during the process can be re-utilized in the process of the invention.

While the invention has been depicted and described by reference to exemplary embodiments of the invention, such a reference does not imply a limitation on the invention, and no such limitation is to be inferred. The invention is capable of considerable modification, alteration, and equivalents in form and function, as will occur to those ordinarily skilled in the pertinent arts having the benefit of this disclosure. The depicted and described embodiments of the invention are exemplary only, and are not exhaustive of the scope of the invention. Consequently, the invention is intended to be limited only by the spirit and scope of the appended claims, giving full cognizance to equivalence in all respects. All references cited herein are hereby incorporated by reference in their entirety.

We claim:

1. A process for the removal of pollutants from a combustion process that produces an emission comprising:
    (a) cooling the emission to a temperature of about 200° C.;
    (b) removing nitrogen, water and oxygen from the emission, wherein a gas containing a concentration of pollutants is produced;
    (c) contacting the gas with an aqueous magnesium chloride solution, wherein a slurry mixture is formed; and
    (d) cooling the gas and the slurry mixture, wherein hydrochloric acid vapour and a sludge are formed.

2. The process of claim 1 further comprising: (e) collecting the hydrochloric acid vapour formed in step (d).

3. The process of claim 2 further comprising: (f) reacting the collected hydrochloric acid with a magnesium based mineral selected from the group consisting of Serpentine, Antigorite, Lizardite, Olivine or Dunite, wherein the magnesium chloride solution is produced.

4. The process of claim 1 wherein in step (a) the emission gas is cooled to a temperature below about 200° C.

5. The process of claim 1 wherein in step (a) the emission gas is cooled to a temperature between about 150° C. to about 200° C.

6. The process of claim 1 wherein in step (b) the removal of nitrogen, water and oxygen from the emission comprises using two air separation membranes, wherein the first air separation membrane removes nitrogen and the second air separation membrane removes water and oxygen.

7. The process of claim 1 wherein in step (c) the aqueous magnesium chloride solution is in the form of a mist of droplets.

8. The process of claim 7 wherein the size of the droplets is between about 20 to about 30 microns.

9. The process of claim 7 wherein the mist is formed by forcing the solution through an orifice under pressure.

10. The process of claim 1 wherein the aqueous magnesium chloride solution comprises about 15 to 30% $MgCl_2$.

11. The process of claim 1 wherein in step (d) the gas and slurry mixture is cooled to a temperature of less than about 10° C.

12. The process of claim 1 wherein after step (b) the gas comprises concentrated pollutants selected from the group consisting of mercury, nickel, copper, iron, chlorine, sulphur, a nitrogen compound, an oxygen compound, a carbon compound or combinations thereof.

13. The process of claim 1 wherein the emission comprises mercury and sulphur after step (d) the sludge comprises mercuric sulphide.

14. The process of claim 1 wherein the emission comprises sulphur and after step (d) the sludge comprises magnesium sulphate.

15. The process of claim 1 wherein the emission comprises nitrogen and oxygen and after step (d) the sludge comprises magnesium nitrate.

16. The process of claim 1 wherein the emission comprises carbon and after step (d) the sludge comprises magnesium carbonate.

* * * * *